(12) United States Patent
Morse et al.

(10) Patent No.: US 7,535,465 B2
(45) Date of Patent: May 19, 2009

(54) METHOD AND SYSTEM TO DISPLAY MEDIA CONTENT DATA

(75) Inventors: Lee Morse, Sunnyvale, CA (US); David Beauchesne, Scotts Valley, CA (US)

(73) Assignee: Creative Technology Ltd., Singapore (SG)

( * ) Notice: Subject to any disclaimer, the term of this patent is extended or adjusted under 35 U.S.C. 154(b) by 428 days.

(21) Appl. No.: 10/654,122

(22) Filed: Sep. 2, 2003

(65) Prior Publication Data

US 2005/0057538 A1 Mar. 17, 2005

(51) Int. Cl.
G09G 5/00 (2006.01)
(52) U.S. Cl. .................................... 345/204
(58) Field of Classification Search ............. 345/204
See application file for complete search history.

(56) References Cited

U.S. PATENT DOCUMENTS

| | | | | |
|---|---|---|---|---|
| 5,515,052 | A | * 5/1996 | Darbee | 341/176 |
| 5,952,995 | A | * 9/1999 | Barnes | 345/157 |
| 6,104,334 | A | 8/2000 | Allport | |
| 6,157,377 | A | 12/2000 | Shah-Nazaroff et al. | |
| 6,157,411 | A | 12/2000 | Williams et al. | |
| 6,463,465 | B1 | 10/2002 | Nieuwejaar | |
| 6,502,194 | B1 | 12/2002 | Berman | |
| 6,826,283 | B1 | 11/2004 | Wheeler et al. | |
| 7,069,508 | B1 * | 6/2006 | Bever et al. | 715/234 |
| 7,089,321 | B2 | 8/2006 | Hayashi | |
| 7,251,413 | B2 | 7/2007 | Dow et al. | |
| 2001/0005201 | A1* | 6/2001 | Digiorgio et al. | 345/204 |
| 2002/0054028 | A1* | 5/2002 | Uchida et al. | 345/173 |
| 2002/0087996 | A1 | 7/2002 | Bi et al. | |
| 2002/0147985 | A1 | 10/2002 | Miyajima et al. | |
| 2002/0184625 | A1 | 12/2002 | Allport | |
| 2003/0140343 | A1 | 7/2003 | Falvo et al. | |

(Continued)

FOREIGN PATENT DOCUMENTS

WO WO-02052540 A1 7/2002

(Continued)

OTHER PUBLICATIONS

"International Search Report in PCT/SG2004/000246", (Oct. 26, 2004), 4 pages.

(Continued)

Primary Examiner—Sumati Lefkowitz
Assistant Examiner—Tammy Pham
(74) Attorney, Agent, or Firm—Schwegman, Lundberg & Woessner, P.A.

(57) ABSTRACT

A method and system is provided to display media content data for playback on a playback device. The system may include a playback unit and a remote control device. The playback unit may include a media content data storage communication interface to communicate with a media storage device thereby to receive the media content data. Further, the playback unit may include a display data processor to process the media content data and generate display metrics based on the media content data, and a bi-directional remote control communication interface. The remote control device may be used to select the digital media for playback on the playback device and include a complemental remote control communication interface communication with the communication interface of the playback unit. Further, the remote control device may include a display screen, and a display rendering module to display the media content data on the display screen based on the display metrics.

15 Claims, 15 Drawing Sheets

U.S. PATENT DOCUMENTS

| | | | |
|---|---|---|---|
| 2003/0158899 | A1 | 8/2003 | Hughes |
| 2004/0003398 | A1 | 1/2004 | Donian et al. |
| 2004/0030599 | A1 | 2/2004 | Sie et al. |
| 2004/0199654 | A1 | 10/2004 | Juszkiewicz |
| 2004/0224638 | A1 | 11/2004 | Fadell et al. |
| 2004/0249915 | A1 | 12/2004 | Russell |
| 2005/0005300 | A1 | 1/2005 | Putterman et al. |
| 2005/0071278 | A1 | 3/2005 | Simelius |
| 2005/0076388 | A1 | 4/2005 | Morse et al. |
| 2005/0262535 | A1* | 11/2005 | Uchida et al. ............ 725/80 |

OTHER PUBLICATIONS

"Niveus Control (Pocket PC Remote)", web.archive.org/web/20040302151631/store.niveusmedia.com/s.nl/c.304836/sc.2/category.2/it.l/id.5/.f. As archived Mar. 2, 2004, 2 pages.

"Philips iPronto: Dashboard for the Digital Home", web.archive.org/web/20030624030854/www.remotecontrol.philips.com/library/ipronto/Whilepaper_iPronto.pdf. As archived on Jun. 24, 2003, (2002), 13 pages.

"Salling Clicker v.2.0.1", web.archive.org/web/20030801113722/homepage.mac.com/jonassalling/Shareware/Clicker, As archived on Aug. 1, 2003, 2 pages.

"SLIMP3 Network MP3 Player", web.archive.org/web/20030716140634/slimdevices.com/downloads/SLIMP3.pdf, As archived on Jul. 16, 2003, 2 pages.

"TelCanto for SlimServer Features", http:www.telcanto.com/description_slimclient.htm, 2 pages.

"U.S. Appl. No. 10/654,338 Response to Final Office Action mailed May 23, 2007", 18 pgs.

"U.S. Appl. No. 10/654338 Non-Final Office Action Mailed Oct. 15, 2007", 16 pgs.

"U.S. Appl. No. 10/654,338, Advisory Action mailed Jul. 26, 2006", 7 pgs.

"U.S. Appl. No. 10/654,338, Final Office Action mailed May 3, 2006", 13 pgs.

"U.S. Appl. No. 10/654,338, Final Office Action mailed May 23, 2007", 13 pgs.

"U.S. Appl. No. 10/654,338, Non Final Office Action mailed Oct. 23, 2006", 11 pgs.

"U.S. Appl. No. 10/654,338, Non-Final Office Action mailed Apr. 30, 2008", 16 Pgs.

"U.S. Appl. No. 10/654,338, Response filed Sep. 2, 2003 to Advisory Action mailed Aug. 18, 2006", 22 pgs.

"U.S. Appl. No. 10/654,338, Response filed Sep. 2, 2003 to Final Office Action mailed Jul. 14, 2006", 21 pgs.

"U.S. Appl. No. 10/654,338, Response filed Sep. 2, 2003 to Non Final Office Action mailed Feb. 13, 2008", 15 pgs.

"U.S. Appl. No. 10/654,338, Response filed Sep. 2, 2003 to non Final Office action mailed Feb. 21, 2007", 17 pgs.

"U.S. Appl. No. 10/654,338, Response to filed Sep. 2, 2003 to Non Final Office Action mailed Mar. 15, 2006", 15 pgs.

U.S. Appl. No. 10/654,338 Final Office Action mailed on Oct. 17, 2008, 22 Pgs.

U.S. Appl. No. 10/654,338, Response filed Sep. 2, 2008 to Non-Final Office Action mailed Apr. 30, 2008, 19 pgs.

* cited by examiner

METHOD AND SYSTEM TO DISPLAY MEDIA CONTENT DATA

FIELD OF THE INVENTION

The present invention relates generally to the field of digital media and, more specifically, to a method and a system to display media content data on a remote control device.

BACKGROUND OF THE INVENTION

More and more homes are now being equipped with local area networks. These so-called "home networks" provide digital connectivity using either wired and/or wireless links. Examples of wired links are Ethernet and HPNA Phone Line networks. Examples of wireless links are 802.11a, 802.11b, 802.11g and the like links that may provide digital wireless connectivity throughout the home.

Further, an increasing amount of digital media (e.g., digital media such as audio and video) is being stored on personal computers or PCs. For example, in many homes music and/or video content is stored on a central PC and products are now available that allow a user to reproduce or play back this content on a different playback device (e.g. a TV set or stereo). These products may use a home network to communicate the digital content to a playback client that, in turn, communicates the digital content to a playback device such as a TV set.

SUMMARY OF THE INVENTION

A method and system is provided to display media content data for playback on a playback device. The system may include a playback unit and a remote control device. The playback unit may include a media content data storage communication interface to communicate with a media storage device thereby to receive the media content data. Further, the playback unit may include a display data processor to process the media content data and generate display metrics based on the media content data, and a bi-directional remote control communication interface. The remote control device may be used to select the digital media for playback on the playback device and include a complemental remote control communication interface for bi-directional communication with the remote control communication interface of the playback unit. Further, the remote control device may include a display screen, and a display rendering module to display the media content data on the display screen based on the display metrics.

The invention extends to a playback unit and to a remote control device. The invention also extends to a machine-readable medium including a set of instructions that, when execute by a machine, cause the machine to execute any of the methods described herein.

Other features of the present invention will be apparent from the accompanying drawings and from the detailed description that follows.

BRIEF DESCRIPTION OF THE DRAWINGS

The invention is now described, by way of example and not limitation, with reference to the accompanying diagrammatic drawings in which like reference numerals refer to the same or similar features unless otherwise indicated.

In the drawings.

DETAILED DESCRIPTION

Figure 1:
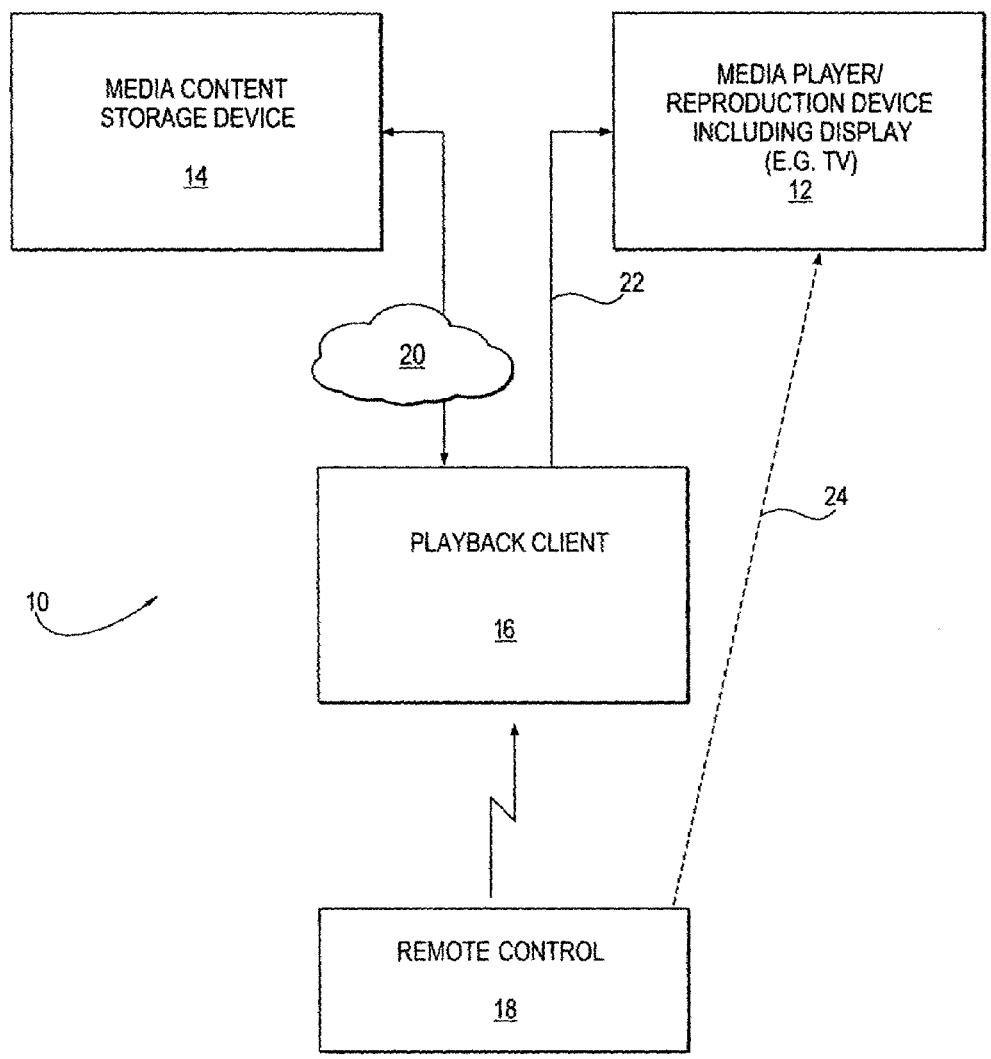
FIG. 1 shows a schematic block diagram of a prior art system to control playback of digital media on a playback device.

A method a system to display media content data for playback on a playback device is described. In the following description, for purposes of explanation, numerous specific details are set forth in order to provide a thorough understanding of the present invention. It will be evident, however, to one skilled in the art that the present invention may be practiced without these specific details.

Referring to the drawings, reference numeral 10 general indicates a system, in accordance with the prior art, to play back digital media on a playback or reproduction device 12. The system 12 includes a media content storage device 14, a playback client 16, and a remote control 18. The media content storage device 14 is typically in the form of a personal computer or PC on which audio files (e.g. music files) are stored. Audio data is typically communicated from the media content storage device 14 to the playback client 16 via a local area network 20 (e.g. a wired network connection, a wireless network connection (e.g., a wireless home network), or the like). The playback client 16 communicates selected audio files to the media player 12 via a hardwired connection 22. The media player 12 is typically a TV set or the like which has a display screen for displaying information to a user of the system 10. In use, the user may view the display screen of the TV set (see arrow 24) and, using the remote control 18, communicate with the playback client 16 to select audio for playback on the media player or playback device 12. In order to accomplish this, the playback client 16 receives the selected audio from the media content storage device 14 and communicates it to the media player or reproduction device 12. Accordingly, in the system 10 of the prior art, the user views some separate or independent display screen such as a TV set and uses the remote control 18 to select audio content for playback based on what is displayed on the TV set. Accordingly, in the prior art, unidirectional communication from the remote control 18 to the playback client 16 takes place and the remote control 18 does not include a display that receives media content information from the playback client 16.

Figure 2:
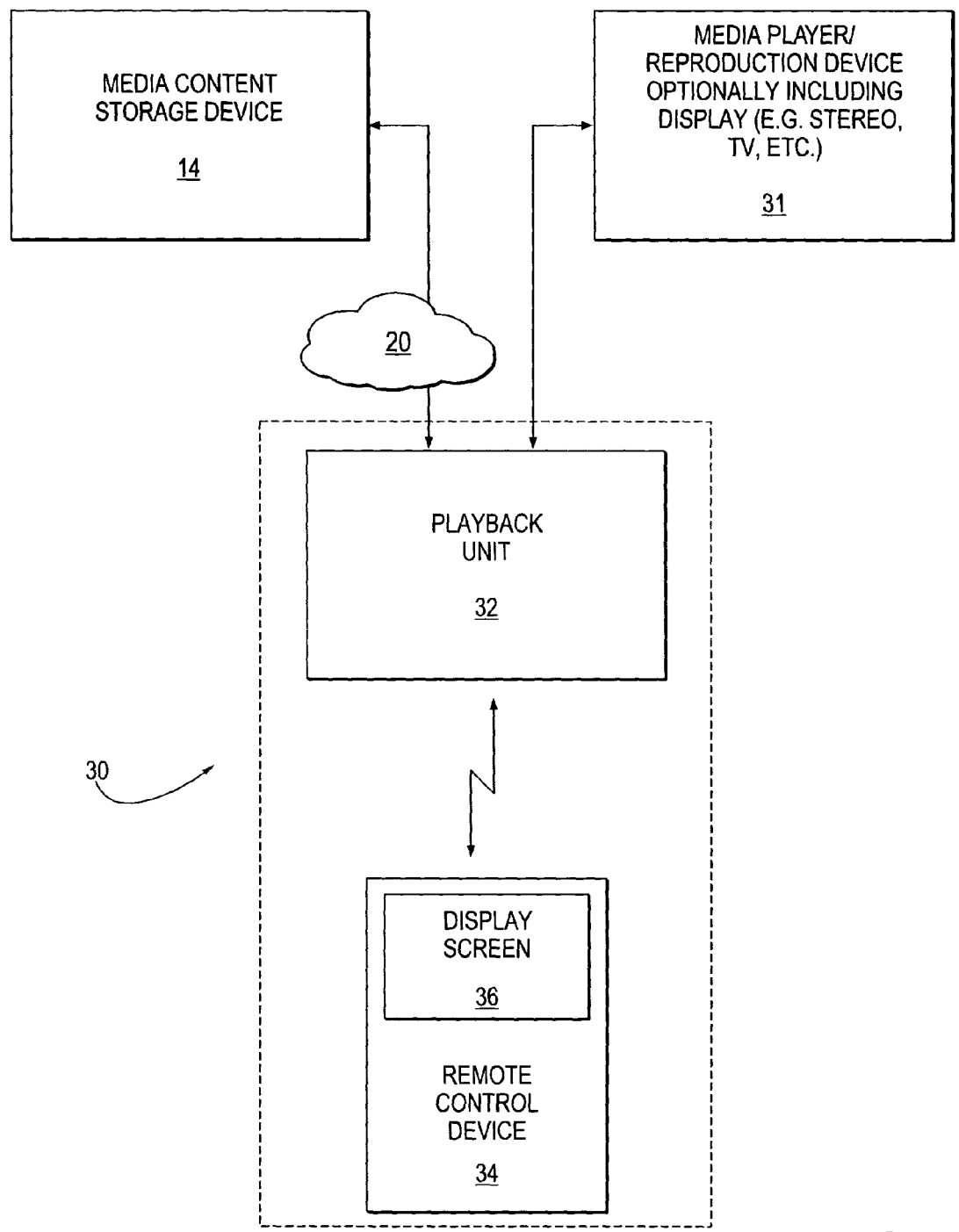
FIG. 2 shows a schematic block diagram of a system, in accordance with the invention, to control playback of digital media on a playback device.

Referring in particular to FIG. 2, reference numeral 30 generally indicates a system, in accordance with the invention, to control playback of digital media on a playback or reproduction device 31. The playback device 31 may be a television set, a stereo or any other playback device for playing back media content (digital and/or analog). It should be noted that the playback device 31 may or may not include a display screen.

Figure 6:
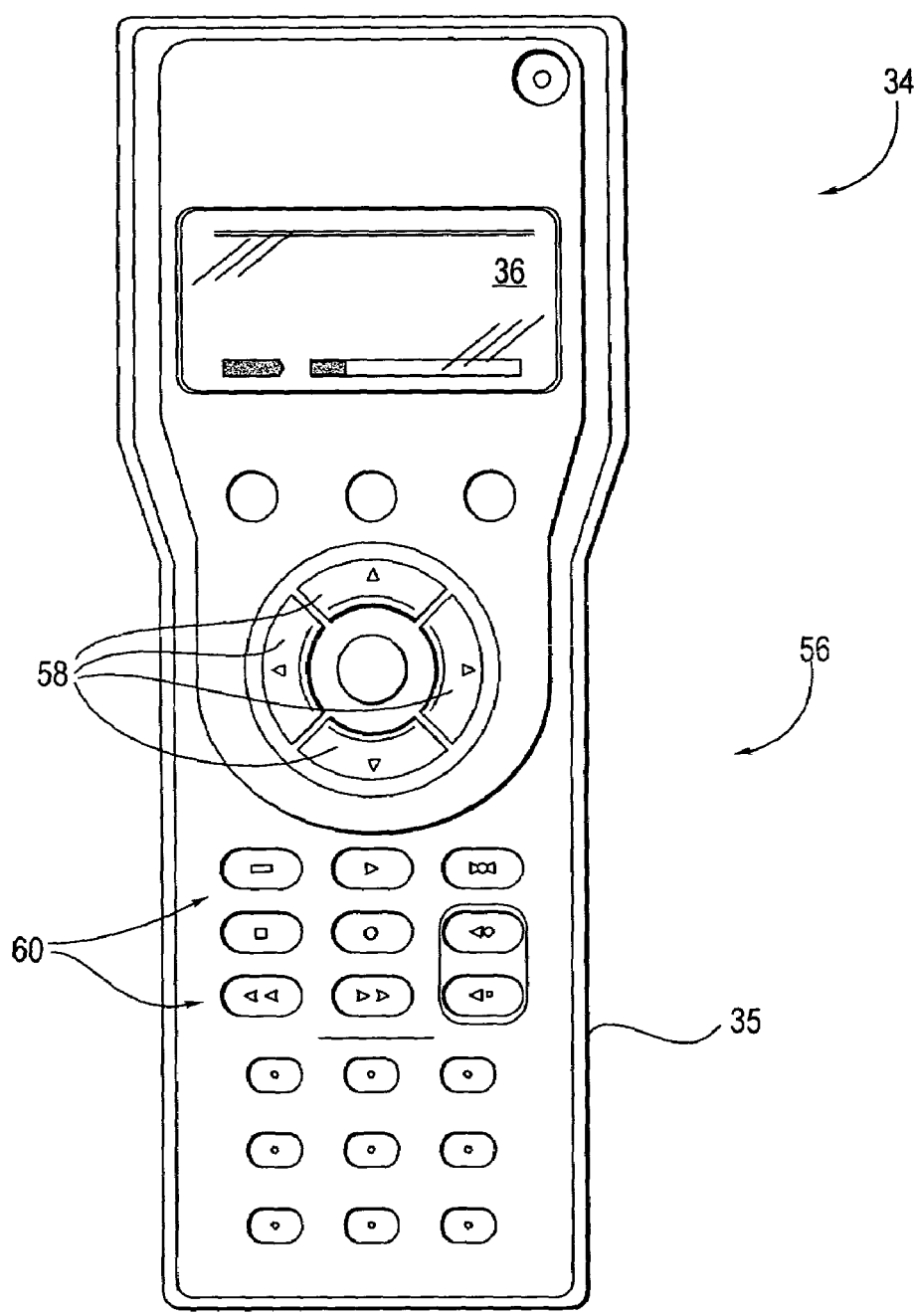
FIG. 6 a shows schematic view of an exemplary remote control device, in accordance with the invention.

The system 30 includes a playback unit 32, also in accordance with the invention, and a remote control device 34, also in accordance with the invention (see also FIG. 6). As described in more detail below, the system 30 displays content data on a display screen 36 of the remote control device 34. For example, the media content storage device 14 may store digital media in the form of music files, video files, photographs, or the like and the playback unit 32 may retrieve content data that identifies, or is associated with, the media files and communicate the content data to the remote control device 34 for display on the display screen 36. Further, as described in more detail below, the user may then select content (selected media) for reproduction or playback on the playback device 31 based on the information provided on the display screen 36. Thus, for example, the content data may include audio track titles, album names, video clip titles, photograph tiles, and so on that reside on the media content storage device 14. It will be appreciated that the media content storage device 14 may include any server (e.g., a personal computer) that may serve digital media content. In the system 30 of FIG. 2, the network 20 may be a wired network (e.g., using an IEEE 1394 connection or the like) or a wireless network (e.g., using 802.11 or any other wireless technology).

Figure 3:
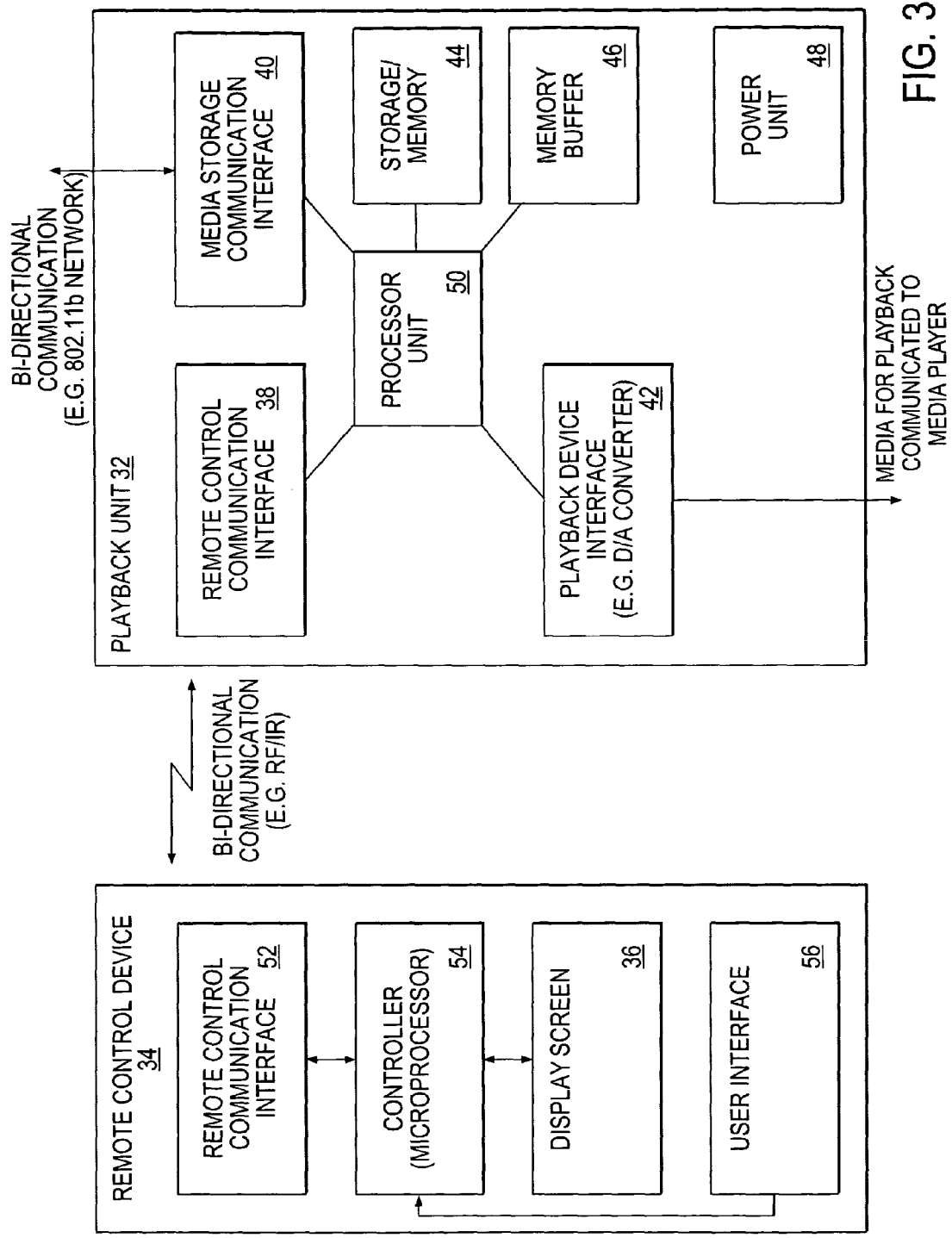
FIG. 3 shows a more detailed schematic block diagram of an exemplary remote control device and an exemplary playback unit of the system of FIG. 2.

Referring in particular to FIG. 3, the exemplary playback unit 32 includes a remote control communication interface 38, a media storage communication interface 40, and a playback device interface 42. Further, the playback unit 32 may include other components such as storage/memory 44, a memory buffer 46, a power unit 48, and a processor unit 50 to control operation of the playback unit 32.

The media storage communication interface 40 is typically a bi-directional communication interface such as a local area network (LAN) wireless device capable, for example, of communicating via a local area network using 802.11a, 802.11b, 802.11g or the like communication protocols. It is, however, to be appreciated that the playback unit 32 may communicate using any communication link or links (both wired and/or wireless) with any one or more digital content servers, as described in more detail below. In one embodiment, the media storage communication interface 40 is configured to communicate with a standard wireless network such as a standard wireless home network. In one embodiment, the playback device interface 42 connects the playback unit 32 to the playback device 31 via a hardwired connection. Accordingly, the playback unit 32 may include RCA, SP/DIF audio outputs, or the like. In one embodiment, the playback device interface 42 includes a digital to analogue converter for converting digital media files (e.g., MP3, JPEG, WAV, AVI, or the like) received from the media content storage device 14 to a suitable form for playback on the playback device 31. The processor unit 50 is typically a microprocessor-based controller or the like to control operation of the playback unit 32. As described in more detail below, the remote control communication interface 38 is a bi-directional communication device to allow bi-directional communication between the remote control device 34 and the playback unit 32.

The remote control device 34 includes a complemental remote control communication interface 52 to communicate in a bi-directional fashion with the remote control communication interface 38 of the playback unit 32. Further, the remote control device 34 includes a controller 54 (e.g. a microprocessor-based controller), the display screen 36 (e.g., 132×64-pixel LCD graphic display providing 5 lines of text display), and a user interface 56 (see also FIG. 6). The user interface 56 includes navigation buttons 58 as well as other functional buttons 60 to allow a user to select and play digital media stored on the media content storage device 14. The user interface 56 and the display screen 36 allow a user to browse (e.g., by artist, album, genre, all tracks, playlist or the like) and select media content stored on the media content storage device 14. In one embodiment, the remote control device 34 includes a hand-held housing 35 which is shaped and dimensioned to render the remote control device 34 portable.

The remote control communication interfaces 38 and 52 may be radio frequency interfaces, optical interfaces (e.g. infrared), or any other communication interface. For example, the communication interfaces 38, 52 may be low power devices having a range suitable for use within a domestic dwelling. The display screen 36 may be an LCD display or the like suitable for displaying data in the form of text to a user so that the user may select content for playback on the playback device 31. As described in more detail below, the display screen 36 may operate in conjunction with the user interface 56 in a menu driven fashion so that media content available on the media content storage device 14 may be displayed to the user on the display screen 36 and, in response thereto, the user may then select one or more media files for playback on the playback device 31. Thus, unlike the prior art where the playback device 31 itself provides a display screen to display the media content available on the media content storage device 14 to the user, the remote control device 34, in accordance with the present invention, includes the display screen 36 for displaying media content to the user for selection.

Figure 4:
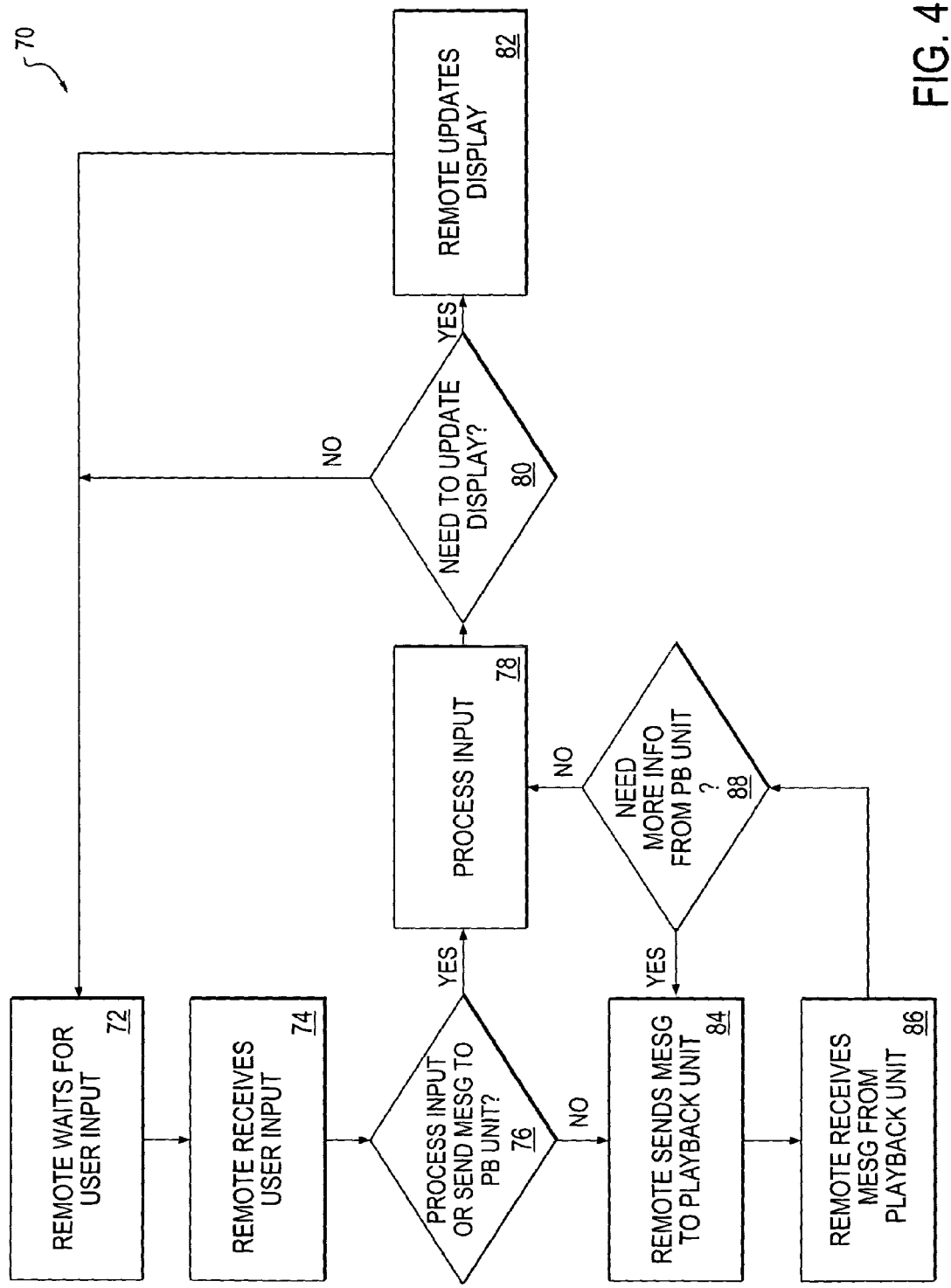
FIG. 4 shows a schematic flow diagram of a method, in accordance with the invention, to control playback of digital media using a remote control device.

Referring in particular to FIG. 4, reference numeral 70 generally indicates a method, in accordance with the invention, to display and control playback of digital media using a remote control device. The method 70 may be carried out on the exemplary remote control device 34. As shown at operation 72, the remote control device 34 waits for user input via the user interface 56. When user activity or input is detected (see operation 74), the method 70 then identifies if the input from the user requires processing or if a message (e.g., requesting media content data) must be sent to the playback unit 32 (see decision operation 76). If the input received from the user requires processing, then the method 70 processes the input or request (see operation 78) and, as shown at decision operation 80, decides whether or not the display screen 36 is to be updated (e.g., scroll through text available on the remote control device 34). If the display screen 36 does not require updating, then the method 70 returns to operation 72. If, however, the display screen 36 requires updating, then the method 70 updates the display screen 36 as shown at operation 82 and, thereafter, returns to operation 72 where it waits for further user input.

Returning to decision operation 76, when the user input requires communication with the playback unit 32, the method 70 proceeds to operation 84 and sends a request or message to the playback unit 32 and awaits a return message as shown at operation 86. For example, when the remote control device 34 requests information from the media content storage device 14 (e.g. information on the content available for playback on the playback device 31), the playback unit 32 may then communicate a media data request to the media content storage device 14 via the local area network 20 (see FIG. 2). In response to the media data request, the media content storage device 14 may then communicate content data to the playback unit 32 which, in turn, communicates the data to the remote control device 34 (see operation 86) for display on the display screen 36. As shown at decision operation 88, the method 70 may identify whether or not further information or data is required from the playback unit 32 (and/or media content storage device 14) and, if so, the method 70 returns to operation 84. If, however, no further information or data is required from the playback unit 32, then the method 70 proceeds to operation 78 where the data is processed.

Figure 5:
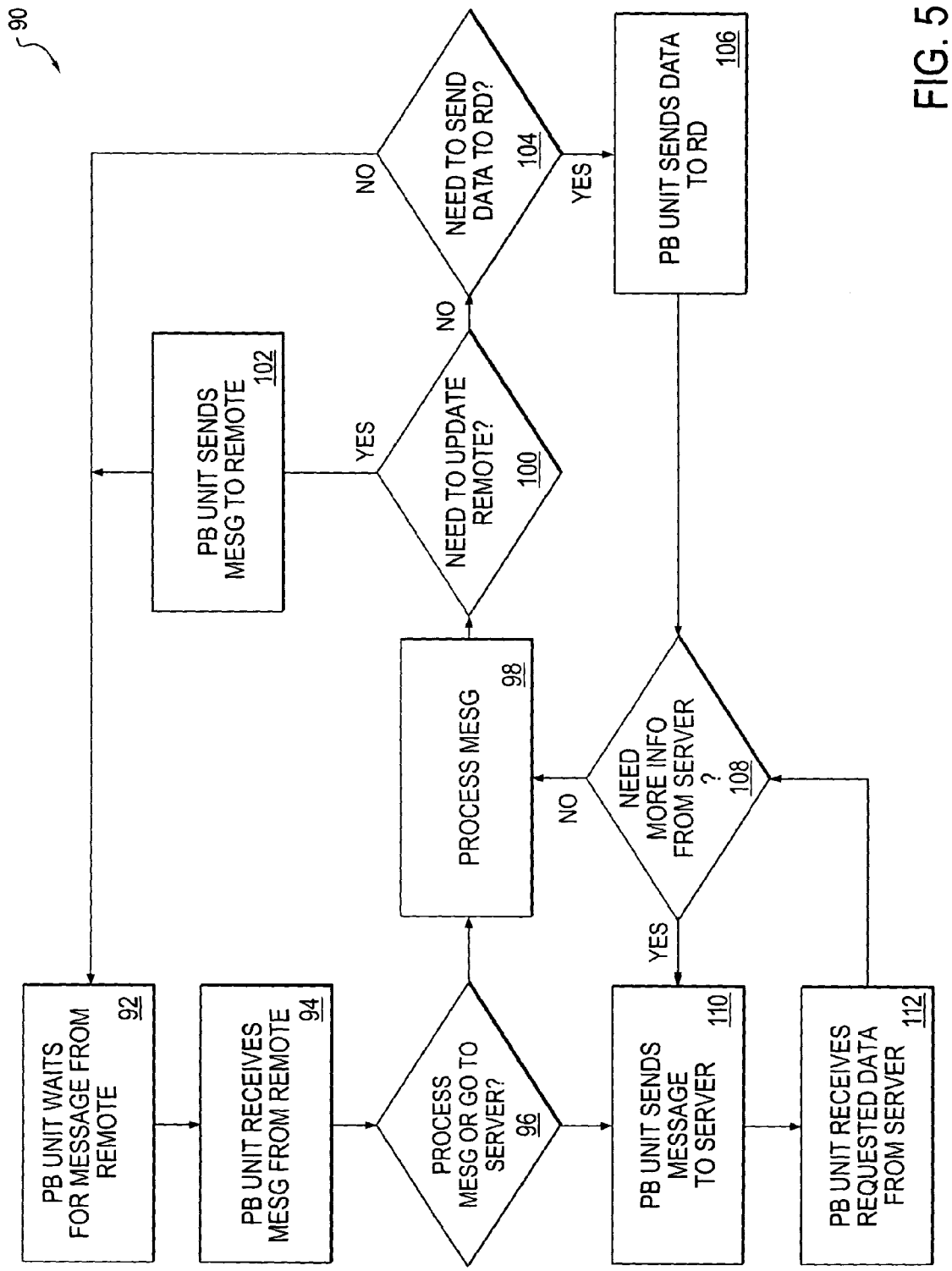
FIG. 5 shows a schematic flow diagram of a method, in accordance with the invention, to control playback of digital media using a playback unit.

Referring in particular to FIG. 5, reference numeral 90 generally indicates a method, in accordance to the invention, to control playback of media data using a playback unit. The method 90 may be carried out on the playback unit 32. As shown at operation 92, the playback unit 32 may await a message or data request from the remote control device 34. When a message or data request is received from the remote control device 34 (see operation 94), then a decision is made at decision operation 96 as to whether or not the playback unit 32 can process the request or whether the request should be communicated to the media content storage device 14. The media content storage device 14 may act as a server that provides the digital media to any one or more playback units 32.

Returning to operation 96, if the playback unit 32 can process the message or data request received from the remote control unit 34, then, as shown at operation 98, the playback unit 32 processes the message. As shown at decision operation 100, a determination is then made as to whether or not the remote control device 34 (e.g., its display screen 36) requires updating. If the remote control device 34 requires updating, then as shown at operation 102, appropriate data is communicated by way of, for example, a message to the remote control device 34 and, thereafter, the method 90 returns to operation 92 where it waits for further user input. If, however, no updating of the remote control device 34 is required, then, as shown at decision operation 104, a determination is made as to whether or not data is to be communicated from the playback unit 32 to the reproduction or playback device 31. For example, if the user has selected a particular media file (e.g. a music file such as an MP3 file) to be played back on the playback device 31, then the playback unit 32 may stream the music file (see operation 106) to the playback device 31.

As shown at decision operation 108, the method 90 then determines whether or not further digital media (e.g., further streaming) is required from the media content storage device 14 and, if so, the playback unit 32 may then send a message/request to the media content storage device 14 requesting further media content (see operation 110). An application running on the media content storage device 14 may then communicate the requested data to the playback unit 32 which then, accordingly, receives the requested media content data (see operation 112). Thereafter, as shown at decision operation 108, a determination is made whether or not further information or data is required from the media content storage device 14. If, however, no more information or data is required from the media content storage device 14, then the method 90 reverts to operation 98 where the message or data is processed. It will be appreciated that any data (e.g., media files) communicated via the system 30 may be compressed and decompressed, encoded, or the like.

Returning to decision operation 96, if the playback unit 32 does not need to process any data (and thus does not need to proceed to operation 98) but requires media content data from the media content storage device 14, then the method 90 proceeds directly to operation 110 where the playback unit 32 sends a request or message to the media content storage device 14.

In one embodiment, the media content storage device 14 is a PC including server software that manages media content stored on the PC and communicates with the playback unit 32 via the network 20. The PC may communicate with any number of playback units 32. In one embodiment, as described in more detail below, a single remote control device 34 can communicate with more than one playback unit 32, one at a time. In one embodiment, the remote control device 34 is an RF remote control with an operating range suitable for use in a domestic dwelling (e.g. a range of 10 about meters).

In one embodiment, operation of the remote control device may be divided into 3 main functional areas, namely, administrative, transport and navigation. Exemplary administrative functions include powering the remote control device 34 up and down, providing information on media presently being played via the reproduction or playback device 31, or the like. Exemplary transport functions include Play/Pause, Scan forward/skip, Scan backward/back, Stop, Mute, Volume up and down, Mode, or the like. Exemplary navigation functions include Menu, Music, Library, Left, Right, Down, Up, Favorites, playlists (e.g., using buttons 1-9), OK (to save settings/select items), or the like.

Reference numeral 120 (see FIG. 8) generally indicates an exemplary graphic user interface presented to the user on the display screen 36 to select digital media stored on, and served from, the digital media storage device 14. In the exemplary embodiment shown in FIG. 8, a user may select group descriptions such as "Favorite Playlists", "Music Library", "Setup", and "Info". It will however be appreciated that the information displayed by the graphic user interface 120 may be dependent upon the digital media available from the digital media storage device 14. As mentioned above, navigation of digital content displayed on the display screen 36 may be accomplished in a drill-down fashion in conjunction with the navigation buttons 58 (see FIG. 6). For example, if the user selects the "Music Library" option 122, then a further graphic user interface 124 may be presented to the user on the display screen 36. In this menu-driven fashion, media content (e.g., music files, video files, pictures, or any other digital media) arranged in a hierarchy 126 (see FIG. 7) may be browsed or navigated. In one embodiment, navigation functionality using the display screen 36 and the user interface 56 may resemble the navigation functionality provided on a Creative NOMAD Jukebox available from Creative Technology Ltd.

Figure 10:
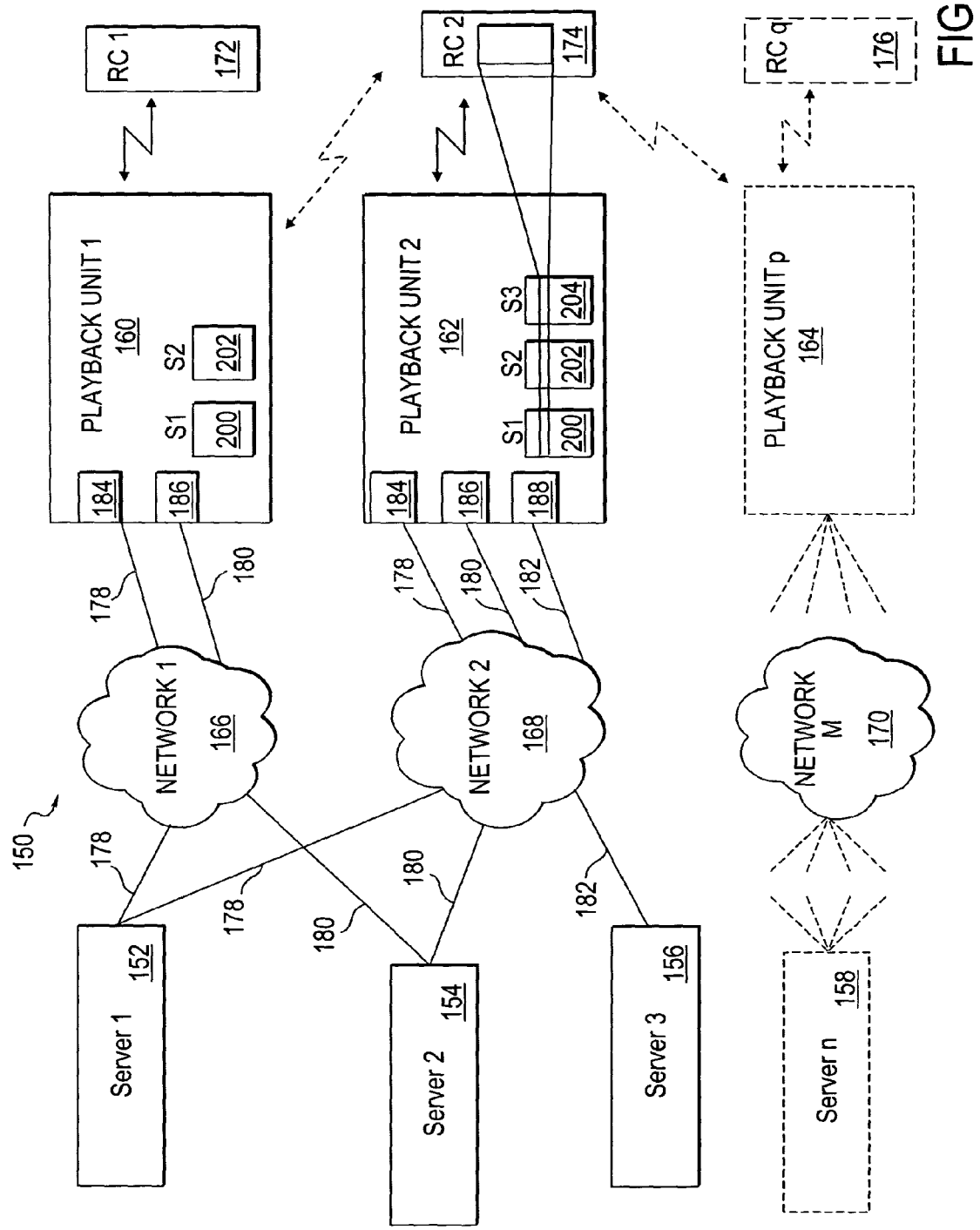
FIG. 10 shows a schematic diagram of a further system, also in accordance with the invention, to control the playback of digital media residing on a plurality of media content storage devices in the exemplary form of digital media servers.

Referring in particular to FIG. 10, reference numeral 150 generally indicates an exemplary system, in accordance with the invention, for controlling the playback of media data sourced from a plurality of media content storage devices. In the system 150, the media content storage devices are shown to be in the form of a plurality of servers 152, 154, 156, and 158. The servers 152 to 158 are connectable to one or more playback units 160, 162, and 164 via one or more networks 166, 168, and 170. Further, each playback unit 160, 162, 164 may communicate with one or more remote control devices 172, 174, and 176. The servers 152 to 158, the networks 166 to 170, the playback units 160 to 164, and the remote control devices 172 to 176 may resemble or be substantially similar to the media content storage device 14, the network 20, the playback unit 32, and the remote control device 34, respectively, as described above.

It is to be appreciated that the networks 166 to 170 need not be identical networks but may differ in nature. For example, the network 166 may be a wireless network whereas the network 168 may be a wired network. Accordingly, the playback unit 160 and the playback unit 162 may each include different media storage communication interfaces to communicate in both a wired and wireless fashion (see, for example, the media storage communication interface 40 of the playback unit 32 shown in FIG. 3). Thus, it will be appreciated, that any combination of wired or wireless networks may form part of the system 150.

Further, a plurality of different communication protocols may be used to communicate with the servers 152 to 158 of the system 150. For example, servers 152, 154, and 156 may each use a different communication protocol when communicating via the networks 166 and 168. Thus, the server 152 may communicate using communication protocol 178 and, accordingly, playback units 160 and 162 may thus include a first driver protocol interface 184 (see also FIG. 12) suitable for interfacing the playback units 160 and 162 via the networks 166 and 168 using the communication protocol 178. Likewise, the server 154 may communicate using a communication protocol 180 and, accordingly, the playback units 160 and 162 may include a second driver protocol interface 186. In a similar fashion, the playback unit 162 may include a third driver protocol interface 188 to communicate with the network 168 using the communication protocol 182. It will be appreciated that each playback unit 160 to 164 may thus include a plurality of different driver protocol interfaces for accommodating communication with the servers 152 to 158 that may use any one of a plurality of driver protocols (e.g., any standard communication protocol such as TCP/IP, or the like).

Figure 12:
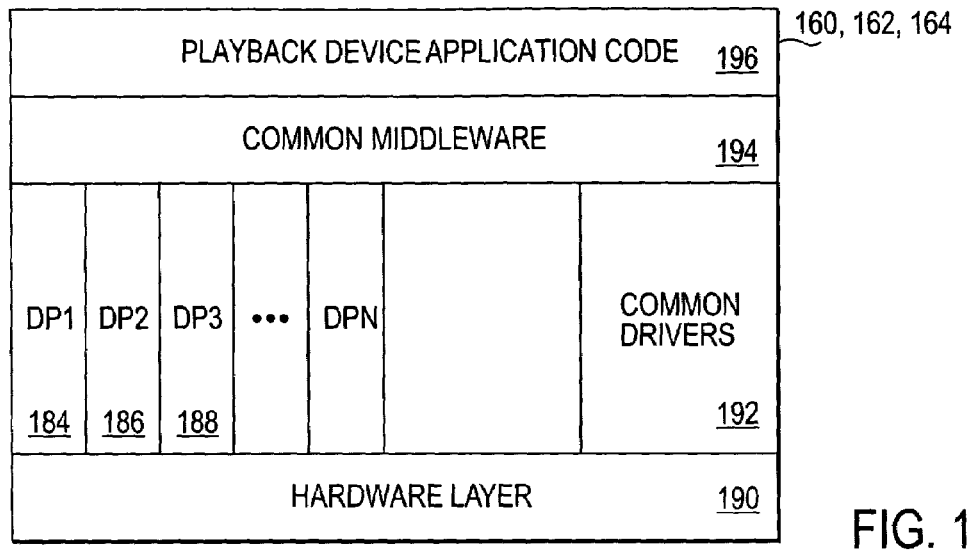
FIG. 12 shows an exemplary configuration of a playback unit used in the system of FIG. 10 showing a plurality of driver protocols.

As shown in FIG. 12, each exemplary playback unit 160 to 164 may include a hardware layer 190 (see, for example, FIG. 3), common drivers 192, for example, to interface the playback units 160 to 164 to playback devices (for example the playback or reproduction device 31 as described above), a common middleware layer 194, and playback device application code 196 that may, for example, execute the method 90 (see FIG. 5).

In one embodiment of the invention, in order to accommodate multiple the servers 152 to 158, each playback unit 160 to 164 may include a stack for storing media content data available from an associated server. For example, the playback unit 160 may include a media content stack 200 associated with the server 152, and a media content stack 202 associated with the server 154. Likewise, the playback unit 162 may include a media content stack 200 associated with the server 152 and a media content stack 202 associated with the server 154. However, in addition to the media content stacks 200 and 202, the playback unit 162 may include one or more further media content stacks, for example, a media content stack 204 associated with the server 156. It will be appreciated that any number of media content stacks may be provided corresponding to additional servers with which a playback unit 160 to 164 is communicating.

Figure 11:
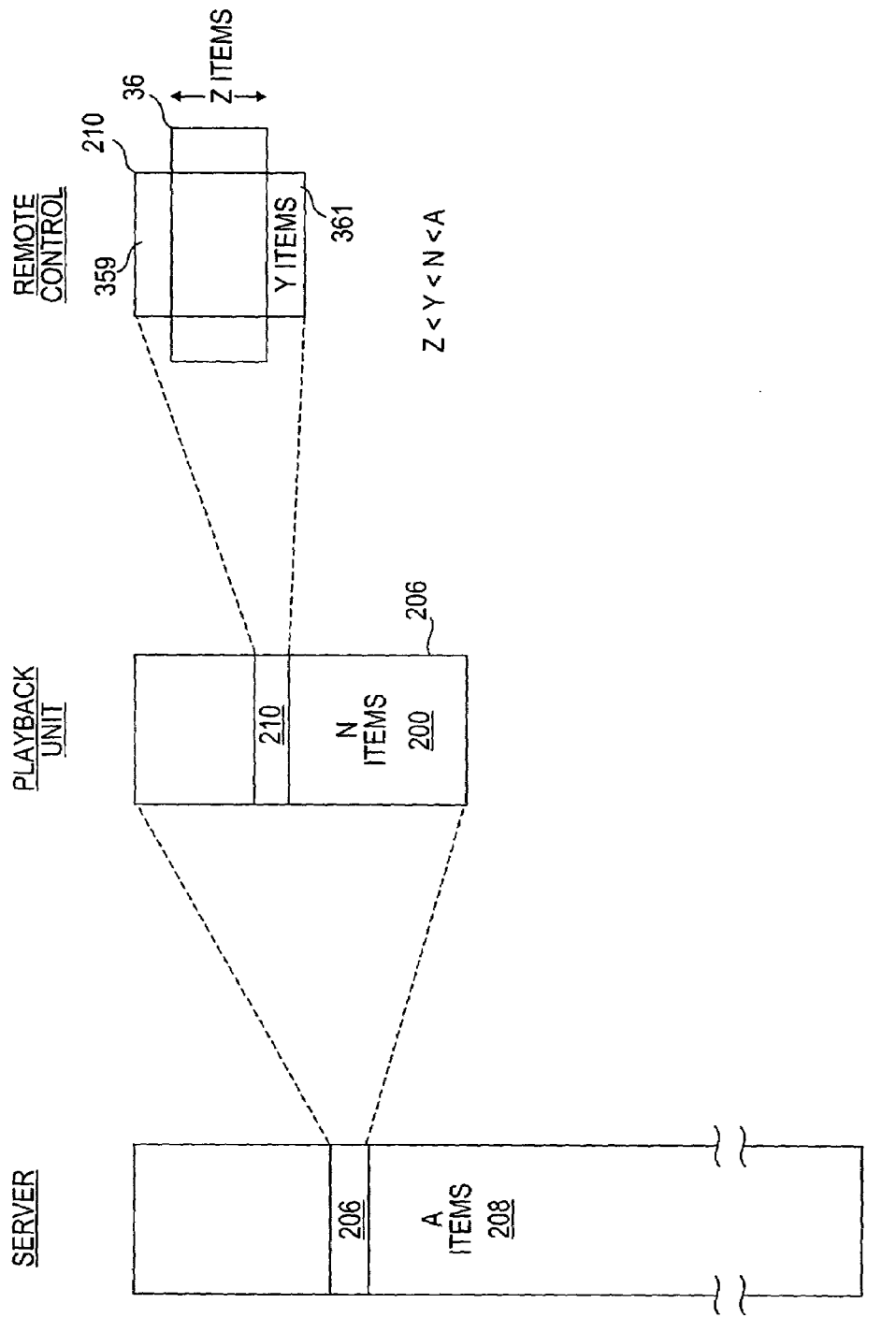
FIG. 11 shows a schematic diagram of sub-sets of media content data stored on a media content storage device, a playback unit, and a remote control device.

As shown in FIG. 11, with specific reference to the exemplary media content stack 200, in one embodiment the media content stack 200 includes a subset (e.g., N items) of media content data 206 that is available from a total amount of media content data 208 on the server 152 (e.g., A items or listings of audio and/or video items or files available for playback). Likewise, media content data provided on any one of the remote control devices 172 to 176 may be a subset 210 (e.g. Y items) of the media content retrieved by the playback units 172 to 176. It will be appreciated that the media content data provided on the playback units 160 to 164 and the remote control units 172 to 176 can dynamically change as a user requests different media content from the servers 152 to 158. Further, the media content retrieved by each playback unit 160 to 164 may differ based on user selection and, likewise, the media content provided on each remote control device 171 to 176 may differ based on user selection.

In one embodiment of the invention, the remote control devices 172 to 176 are substantially similar to the remote control device 30 (see FIG. 2). Each remote control device 172 to 176 may thus include a display screen 36 on which media content data (e.g., Z items) is displayed to the user. However, it will be appreciated that the display screen 36 may be limited in the amount of media content data that it can display to the user (Z<Y<N<A). Accordingly, in one embodiment, each remote control device 172 to 176 stores media content data received from a playback unit 160 to 164 in the media content data stack and only a portion (Z items) of the media content data that is available on the remote control unit 172 to 176 or displayed on the display screen 36. As described in more detail below, a user may then use the exemplary user interface 56 (see FIG. 6) to scroll through media content data (e.g., text) provided in a media content stack (see, for example, the content hierarchy 126 of FIG. 7).

Figure 13:
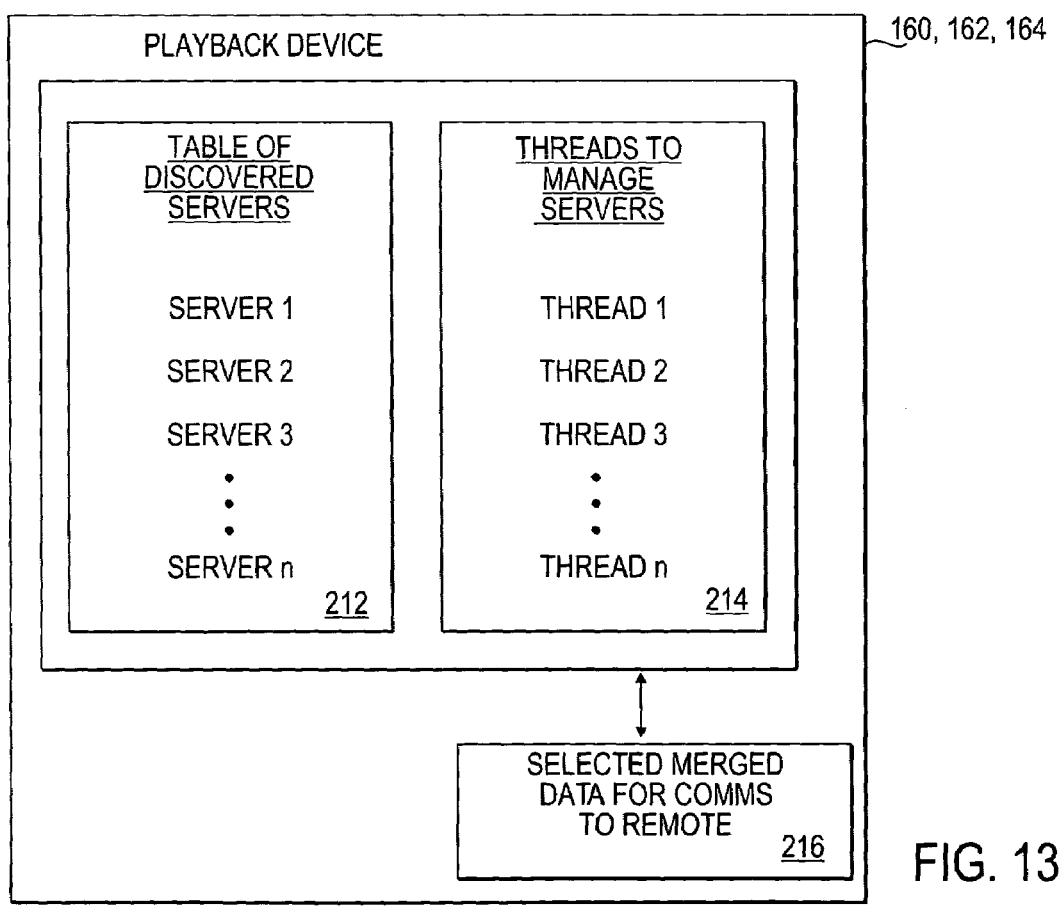
FIG. 13 shows an exemplary table of discovered media storage devices and threads to manage the discovered media storage devices.

In one embodiment of the invention, each playback unit 160 to 164 includes a table of discovered devices or servers 212 (see FIG. 13) wherein data or information on all media content storage devices, such as the servers 152 to 158, is provided. Further, each playback unit 160 to 164 may include threads 214 to manage the servers 152 to 156. In particular, the exemplary playback unit 160 may use the table 212 and the threads 214 to source or retrieve media content data from the servers 152 and 154 and merge the data prior to communication thereof to the remote control device 172 (or any other remote control devices, such as the remote control device 174, with which it may be communicating). Likewise, the playback unit 162 may source media content data from the servers 152 to 156 and merge or combine the media content data received for communication to any one or more remote control devices 174 to 176. In one embodiment, the playback units 160 to 164 may thus include a merge module 216 (see FIG. 13) for merging media content data for communication to one or more remote control devices 172 to 176. The remote control devices 172 to 176 may thus be totally ignorant of the source (e.g., which media content provider) of the media content received from an associated playback unit 160 to 164. The threads 214 may also control playback of selected media (e.g. a selected audio file) on the playback device 31.

In accordance with another aspect of the invention, a master unit such as a playback unit may control operation of a remote control device. For example, in one embodiment, the playback unit may define the "look and feel" of the remote control device, define its functional operation, and/or display format or characteristics.

Figure 14:
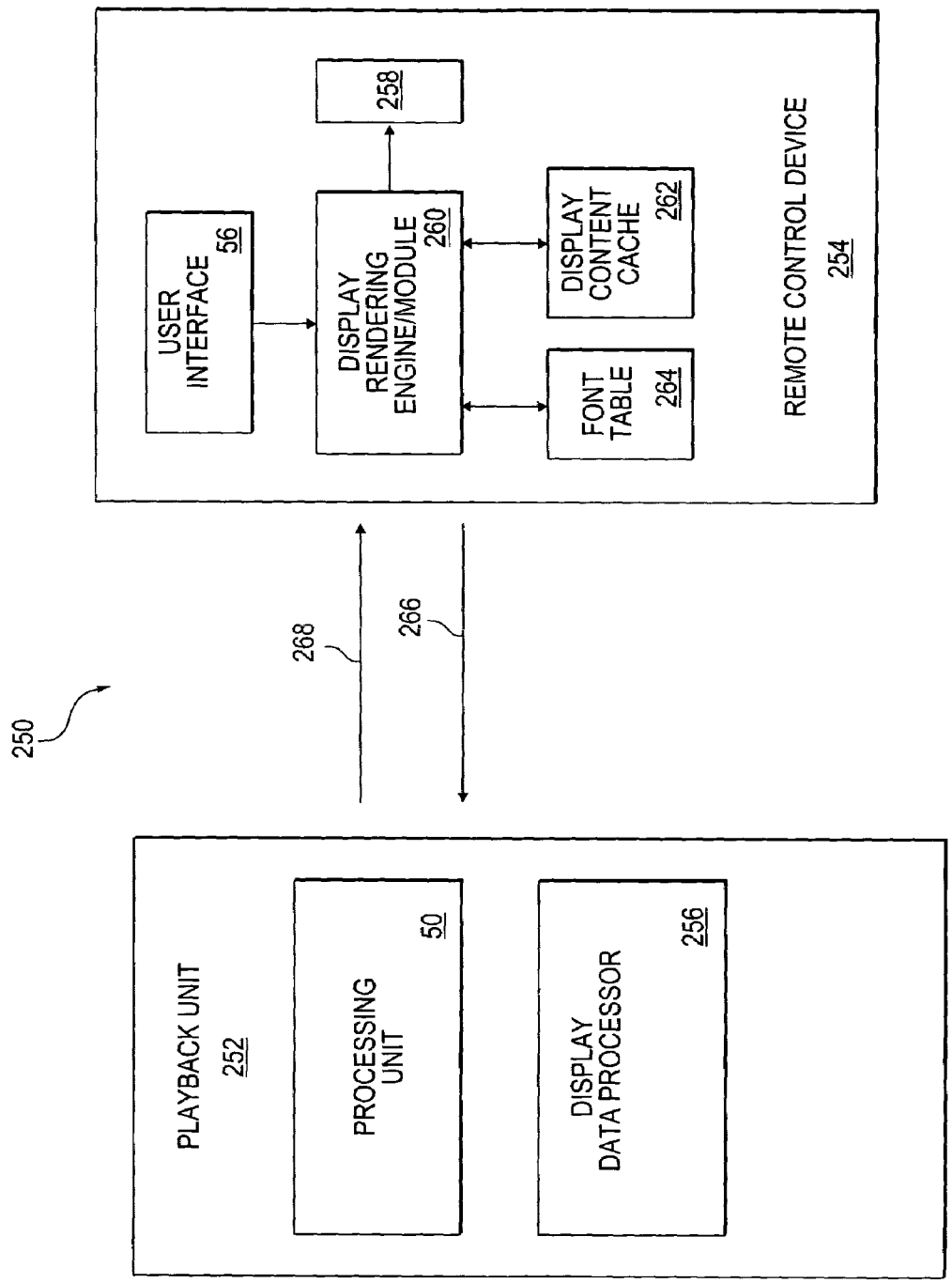
FIG. 14 shows exemplary modules of a remote control device and a playback unit, both in accordance with the invention, in which a font table is provided on the remote control device and an application that uses the font table is provided on the playback unit.

Referring in particular to FIG. 14, reference numeral 250 generally indicates an exemplary system, in accordance with the invention, for controlling the playback of digital media on a playback unit (e.g., the playback unit 31 of FIG. 2). The system 250 includes an exemplary playback unit 252 and an exemplary remote control device 254. The playback unit 252 and the remote control device 254 may resemble the playback unit 32 and the remote control device 34 respectively. However, the playback unit 252 includes a display data processor 256 for processing data or information (e.g., media content data) to be displayed on a display screen 258 of the remote control device 254. The display screen 258 may substantially resemble the display screen 36 and include all or any part of the functionality herein before described. As described in more detail below, the playback unit 252 of the system 250 substantially controls, or at least assists, the remote control device 254 in displaying data or information (e.g., media content data) to a user.

The remote control device 254 includes a user interface 56, a display rendering engine or module 260, a display content cache 262, and an exemplary font table 264. In one embodiment, the font table 264 includes glyph data including a set of glyphs or images that are used in the visual representation of characters on the display screen 258. As described in more detail below, in one embodiment of the system 250 the display data processor 256 is remote from, and separate from, the font table 264 that it requires to process display data for display on the display screen 258 of the remote control device 254. Accordingly, display data (e.g., glyph metrics) is communicated from the remote control device 254 to the playback unit 252 as shown by arrow 266. Thereafter, as described in more detail below, the display data processor 256 processes the media content data or any other data to be displayed on the display screen 258 based on the received display data and communicates display control data (e.g. display metrics) to the remote control device 254 (see arrow 268). Upon receipt of the data to be displayed (e.g., the media content data), the display rendering engine 260 uses the display metrics to arrange the information or data that is displayed on the display screen 258. Thus, in one embodiment, the playback unit acting as a master unit may configure and determine how data is to appear on the display screen of the remote control device.

Figure 15:
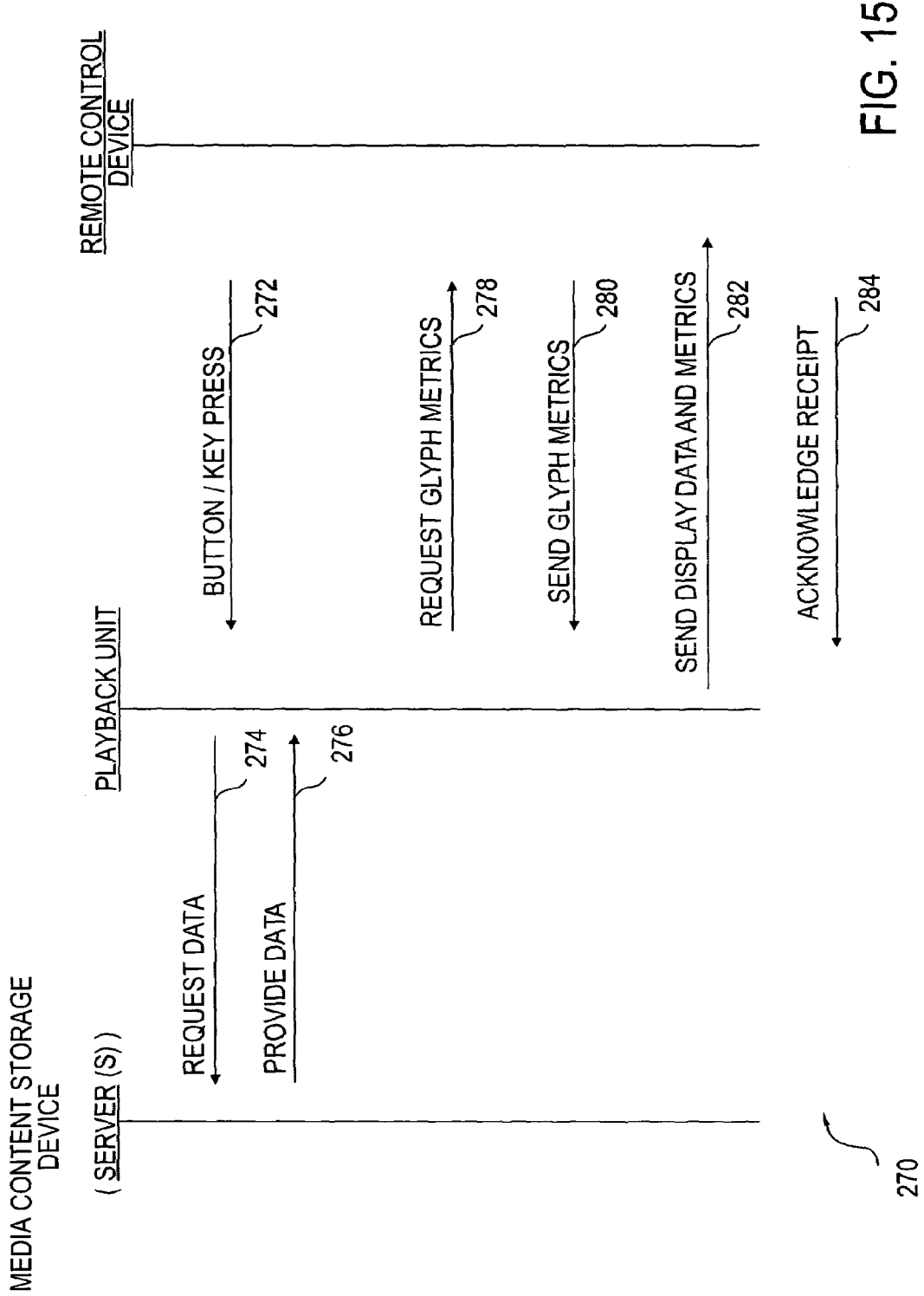
FIG. 15 shows a schematic functional diagram of interaction between the playback unit and the remote control device when accessing the font table and communicating display metrics to the remote control device.

Reference numeral 270 (see FIG. 15) generally indicates exemplary communications between an exemplary remote control device 254 and an exemplary playback unit 252, and the playback unit 252 and a media content storage device (such as the media content storage device 14 of FIG. 2). As described above, user interaction via the user interface 56 may be monitored at the remote control device 254 which then communicates a user action (e.g., activation of a button or key of the user interface 56) to the playback unit 252 as shown by arrow 272. Thereafter, as described above with reference to the playback unit 32, in one exemplary embodiment a decision is made whether or not further content is required from the media content storage device 14 and, if so, a media content data request is communicated from the playback unit 252 to the media storage device 14 as shown by arrow 274. For example, if the user has requested details or data on media (e.g., audio and/or video) available from any one or more servers (e.g., the servers 152 to 158), the playback unit 252 may then request the particular media content data from the associated servers and receive a response (see arrow 276) that indicates, or provides data, on the media content available. The playback unit 252 may then identify or determine what information needs to be displayed on the display screen 258, and suggest how the information should be displayed.

Figure 7:
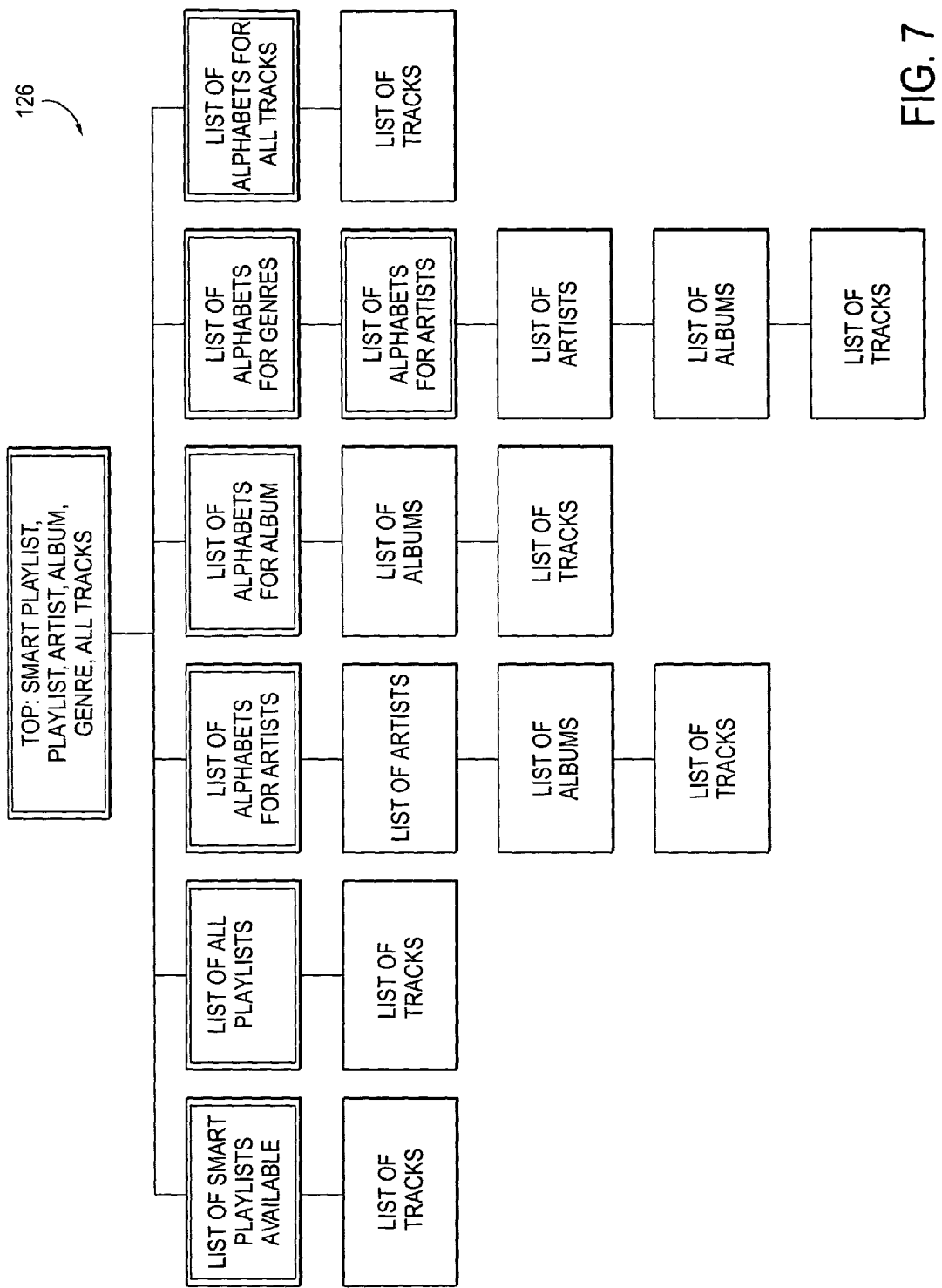
FIG. 7 shows an exemplary media content hierarchy of media content data for display on a display screen of the remote control device.
Figure 8:
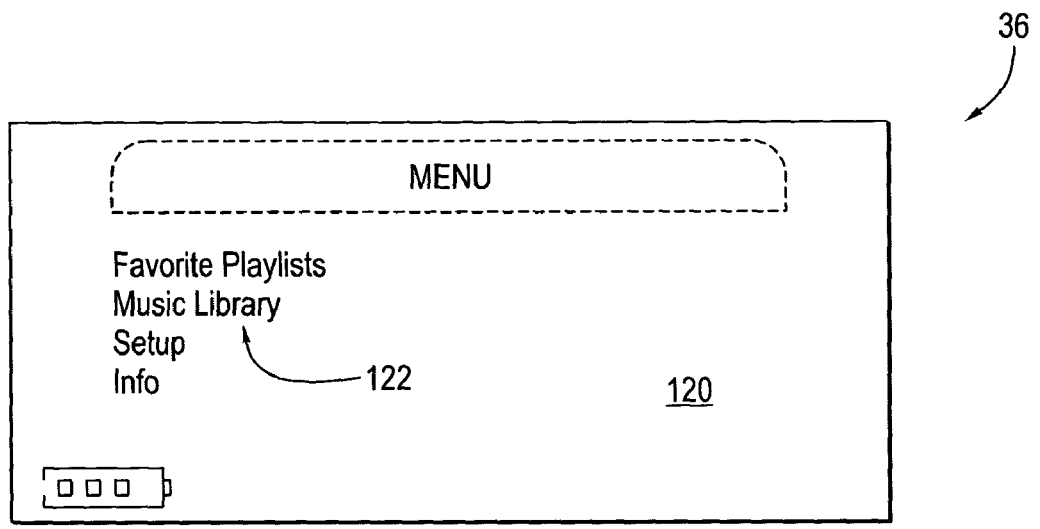
FIG. 8 shows a schematic view of an exemplary user interface presented to the user on the display screen of the remote control device.
Figure 9:
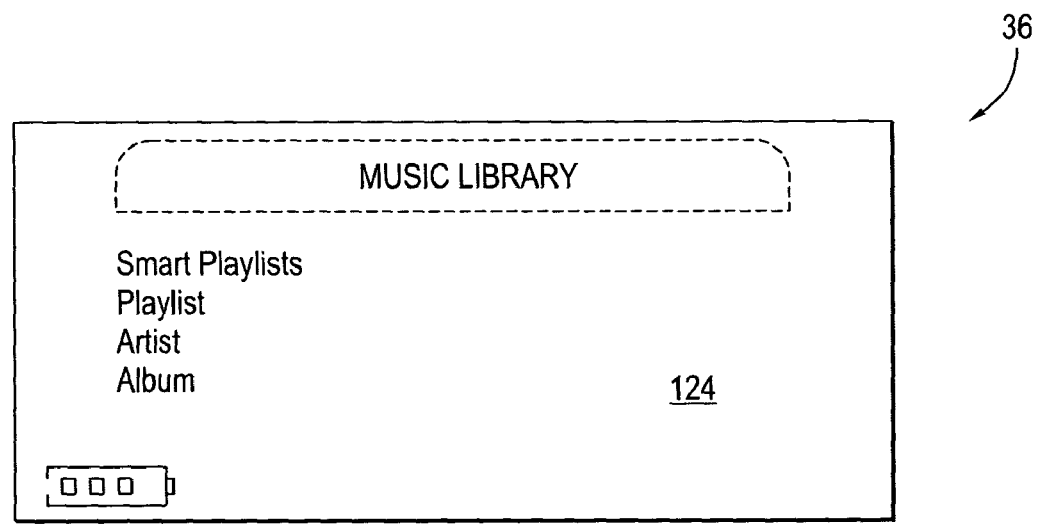
FIG. 9 shows a schematic view of an exemplary user interface to present media content to the user on the display screen.

For example, if media content data such as that provided in the content hierarchy 126 of FIG. 7 is to be communicated for display on the remote control device 254, the display data processor 256 of the playback unit 252 may identify the strings or words or characters to be displayed, as well as a language in which they are to be displayed on the display screen 258. Assuming, for example, included in the data to be displayed is a song title, then the display data processor 256 may identify all the characters in the song title and, for each character (e.g., a letter of the alphabet) request glyph metrics stored in the font table 264 of the remote control device 254 (see arrow 278). The remote control device 254 may then communicate the glyph metrics that have been retrieved from the font table 264 back to the playback unit 252 (see arrow 280). Using the glyph metrics for each character in the exemplary song title, the display data processor 256 may calculate display data and display metrics (e.g., the spacing between the characters or letters, the position of the characters or letters, the size of the characters, or the like) and communicate this data to the remote control device 254 (see arrow 282). Using the display metrics, the display rendering engine 260 may then display the relevant media content data on the display screen 258. In one embodiment, the remote control device 254 acknowledges receipt of the display data and metrics as shown by arrow 284.

Figure 16:
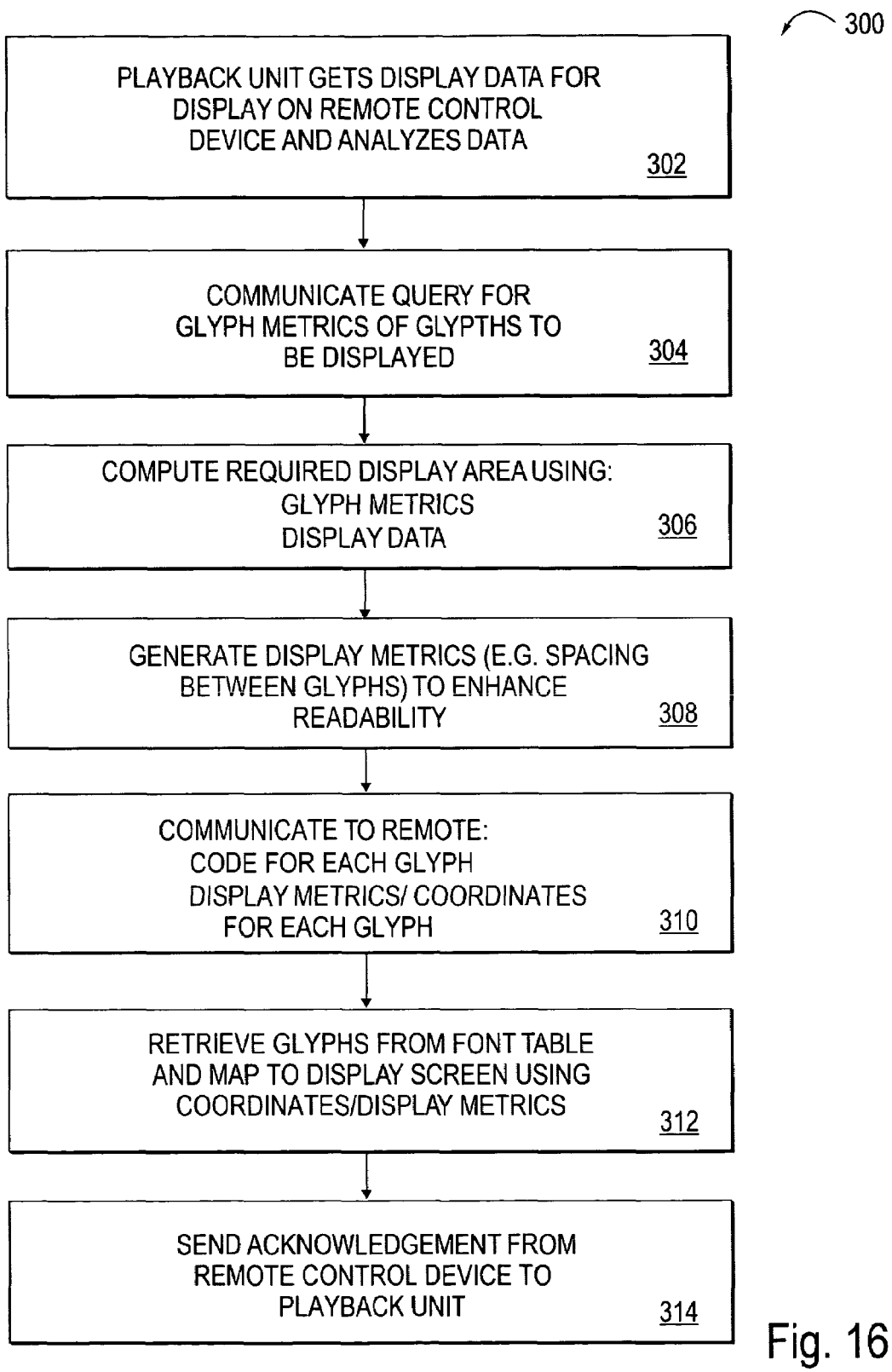
FIG. 16 shows a schematic flow diagram of a method, in accordance with the invention, to control the display of data on a remote control device remotely from a playback unit.

Referring in particular to FIG. 16, reference numeral 300 generally indicates a method, in accordance with the invention, for displaying data on a display screen of a remote control device. In one embodiment of the invention, the remote control device may resemble the exemplary remote control device 254 (see FIG. 14) and, accordingly, the method 300 is described, by way of example, with reference to the remote control device 254. Further, the method 300 may employ a least some of the exemplary communications 270 of FIG. 15.

Although the method 300 is described by way of example with reference to displaying the availability audio or any other media content on the remote control device 254, it is to be appreciated that the method may apply in any environment where a control or master unit communicates with an associated remote control device including a display screen and wherein the master unit includes a display data processor or module that communicates display metrics to the remote control device to influence the display of data on the display screen of the remote control device. Thus, in one embodiment, display processing capabilities may be transferred from the remote control device to the master unit so that the remote control device requires reduced computation or processing capabilities.

Further, the master unit (e.g., the playback unit 252) may optionally include display data or font data that it uses to determine the display metrics for communication to the remote control device. Accordingly, operations shown by arrows 278 and 280 in FIG. 15 may be avoided.

Returning to FIG. 16, as shown at block 302, when the method 300 is used to display exemplary media content data on an exemplary remote control device 254, the playback unit 252 may retrieve requested media content data from the media content storage device that is to be displayed on the remote control device 254. The playback unit 252 and, in particular, the exemplary display data processor 256 may then analyze the data or information (e.g., text) to be displayed. In particular, all the characters making up a string or word(s) of the information are identified. Thereafter, as shown at operation 304, the playback unit 252 communicates a query for glyph metrics of all glyphs to be displayed on the display screen 258. A glyph corresponding to each character or letter to be displayed may be retrieved from the display data or font table 264 provided on the remote control device 254 and returned to the display data processor 256 to process display configuration data or display metrics.

Thereafter, as shown at operation 306, the display data processor 256 may then, using the glyph information associated with the characters, calculate the display area required for each glyph, as well as the total number of characters or letters to be displayed on the display screen 258. Once the glyph metrics and the media content data (e.g., the string or word(s)) have been processed, the display data processor 256 may then generate or adjust the display metrics so as to enhance readability of the information or data on the display screen 258 by a user (see operation 308). In one embodiment, the display data processor 256 may adjust the spacing between glyphs, the relative size that the glyphs occupy on the display screen 258, and so on. Further, in one embodiment, the display data processor 256 may calculate a position on the display screen 258 where each particular glyph is to be located. Accordingly, the display data processor 256, using glyph metrics or information provided in a font table 264 on the remote control device 254, may calculate or determine optimum display parameters for information or data for display on the remote control device 254.

Once the display data processor 256 has generated or defined the display metrics, for example, for enhanced readability on the display screen 258, a code for each glyph as well as the display metrics or coordinates where the particular glyph is to be displayed on the display screen 258 (see operation 310) may be communicated to the remote control device 254.

Upon receipt of the glyph code and display metrics from the playback unit 252, the display rendering engine 260 of the remote control device 254 may retrieve glyphs corresponding to the codes from the font table 264 and display them on the display screen 258 using the coordinates or display metrics calculated remotely at the playback unit 252 (see operation 312). Thereafter, the remote control device 254 may communicate an acknowledgment to the playback unit 252 to confirm that the data has been processed (see operation 314).

In certain embodiments of the invention, the display data processor 256 also performs kerning on the data to be displayed on the display screen 258. Accordingly, spacing between each character to be displayed on the display screen 258 may be adjusted thereby to enhance the readability by a user, adjust the quantum of information or number of characters displayed in a particular line on the display screen 258, or the like. Further, in one embodiment of the invention, the display rendering engine 260 may scroll data (e.g. media content data) in a horizontal fashion (marquee) on any one or more display lines that may be provided on the display screen 258. Further, both vertical and horizontal kerning may be provided by the display data processor 256. Accordingly, not only in a horizontal but also in a vertical fashion, the display metrics or display parameters of characters may be adjusted to enhance the amount of data displayed on the display screen 258 and/or enhance its readability.

In one embodiment of the invention, the display data processor 256 also adjusts an amount of space to leave clear around each glyph to enhance readability. Accordingly, it will be appreciated that the display data processor 256, using data retrieved from the remote control device 254, may control the display of data on the remote control device 254 thereby allowing for reduced computational complexity in the remote control device 254.

In one embodiment of the invention, when the remote control device 254 includes the display content cache 262, the display rendering engine 260 may allow vertical scrolling of media content data displayed on the display screen 258. For example, as shown in FIG. 11, the display content cache 262 may include more data than the display screen 258 can display in a readable fashion at any one time and, accordingly, the display rendering engine 260 may thus only display a subset of the actual information (e.g., media content data) stored in the remote control unit 254. Thus, in one embodiment of the invention, the exemplary navigation buttons 58 (see FIG. 6) may be used to scroll through media content sourced from the media content storage device 14.

It will be appreciated that in one embodiment of the invention, the layout, size and other display metrics of the information or data for display on a remote control device may be remotely determined at a master or control device and the remote control device may merely map glyphs or any other display images to its display screen.

Figure 17:
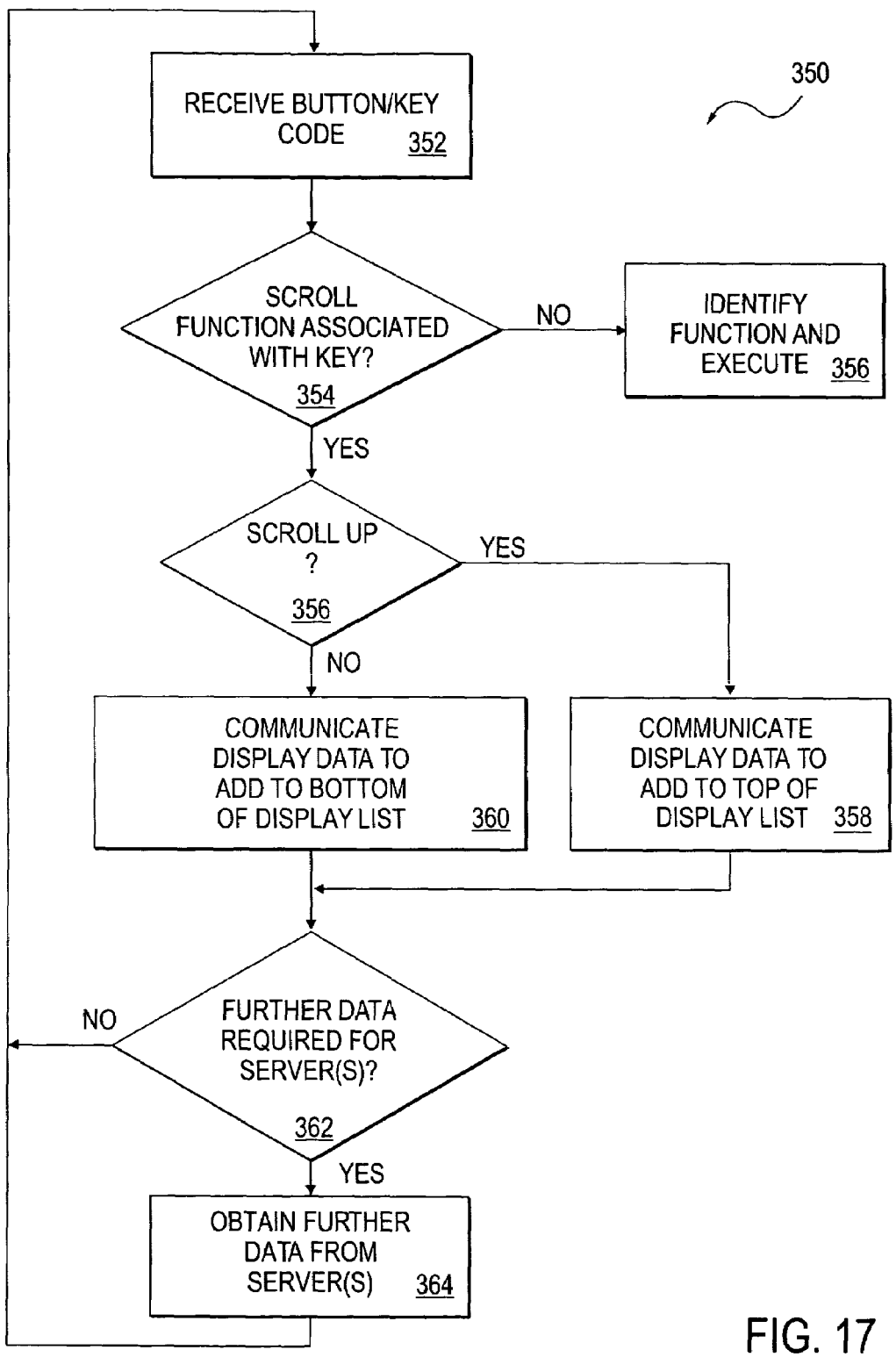
FIG. 17 shows a schematic flow diagram of a method, in accordance with the invention, to provide data for display on a remote control device.

Referring in particular to FIG. 17, reference numeral 350 generally indicates a method, in accordance with the invention, to control the display of data on a display screen of a remote control device. For example, the method 350 may be implemented by the display data processor 256 of the playback unit 252 and is thus described, by way of example, with reference thereto.

As shown at operation 352, the playback unit 252 may receive an indication (e.g., a key code) from the remote control unit 254 that a button or key on the exemplary user interface 56 has been pressed or activated. Thereafter, as shown at decision operation 354, the display data processor 256 may determine whether or not a scroll function is associated with the particular button or key that was activated. If no scroll function is associated with the key, then the playback unit 252 may identify a function associated with the button or key (e.g. with the code received) and execute the function (see operation 356). Examples of such functions in a media playback application include pause, play, rewind, fast-forward, stop, or the like.

If, however, a scroll function is associated with the key or button that has been pressed, then as shown at decision operation 356 the display data processor 256 may identify if the user has selected to scroll up or to scroll down. If the user has selected to scroll up, then as shown at decision operation 358, the display data processor 256 may communicate data that is to be added to a top of a display content cache (e.g., the display content cache 262). For example, data in a top 359 of the subset 210 (see FIG. 11) of the media content stack may be updated. In one embodiment, the display content cache may be defined by a circular buffer and the media content data update may then be added at an appropriate portion of the display content cache so that it is stored in a position towards which the user is scrolling. Accordingly, the playback unit 252 may thus, in an anticipatory fashion, provide data to the display content cache 262 which is expected to be displayed on the display screen 258 in the near future.

Returning to decision operation 356, in a similar fashion, if the display data processor 256 identifies that the user has not selected to scroll up but, instead, selected to scroll down, then the playback unit 252 communicates display data (e.g. a media content data update) to add to a bottom of the display list stored in the display content cache 262 (see operation 360). For example, data at a bottom 361 of the subset 210 of the media content stack may be updated.

Thereafter, as shown at decision operation 362, the playback unit 252 (e.g. the processing unit 50) identifies whether or not further data is required from the media content storage device (e.g., the servers) and, if so, the further data is obtained from the servers (see operation 364) whereafter the method 350 returns to operation 352 to monitor further key or button activation by the user. If, however, no further information is required from the servers, the method 350 may proceed directly from decision operation 362 to operation 352.

Thus, for example, media content data may be updated in an anticipatory fashion on the remote control device 254 by the playback unit 252. When the user scrolls up, a top of a display stack may be updated, and when a user scrolls down a bottom of a display stack may be updated.

Once a user has selected content (e.g., a audio track, video clip, or the like, it may be streamed from the media content storage device to the playback device 131 in a conventional fashion. The playback unit 32, 160 to 164, and 252 may then communicate or route the selected media to an appropriate playback device. Accordingly, the exemplary playback unit 32, 160 to 164, and 252 may include other components which are readily known to a person of skill in the art.

Thus, method and system to display media content data for playback on a playback device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to display data that describes media content playable on a separate media player to a user, the system including:
    a master unit including a display data processor to generate display metrics associated with the data; and
    a portable remote control device for remote operation by the user and separate from the master unit, the portable remote control unit including a display screen and a display rendering module that renders images used in the visual representation of the data to the display screen based on the display metrics received wirelessly from the master unit,
    wherein the portable remote control device is configured to transmit glyph metrics to the master unit for use by the master unit in calculating the display metrics for use by the portable remote control device in displaying the data, the data describing the media content playable on a media player that is controllable by the master unit,
    wherein the master unit is configured to transmit a request for the glyph metrics to the remote control device in response to a user action sent from the remote control device and the remote control device is configured to responsively retrieve the glyph metrics from a table and transmit the retrieved glyph metrics to the mater unit,
    wherein glyph metrics comprise information about glyphs to be displayed on the remote control device indicated by the master unit in the request, the glyphs including symbols, images and characters, and
    wherein the display metrics generated by the master unit and provided to the portable remote control device define a manner in which the glyphs are to be displayed on the display screen including spacing to enhance readability.

2. The system of claim 1, wherein the master unit wirelessly receives the glyph metrics from the remote control device and generates the display metrics for wireless communication to the portable remote control device based on the glyph metrics,
    wherein in further response to the user action sent from the remote control device:
    the display rendering module renders images used in a visual representation of the data to the display screen based the display metrics.

3. The system of claim 2, wherein the remote control device includes a user interface separate from the display that operates in a menu-driven fashion, the master unit defining the functionality of the user interface, and
    wherein the display metrics define a manner in which a content item or character is displayed on the display screen, the display metrics including spacing to enhance readability of a content item of character on the display screen.

4. A method to display media content data to a user for playback of selected digital media on a playback device via a playback unit, the method including:
    at the playback unit,
    receiving media content data from a media storage device, the media content data identifying media available for playback on the playback device; and
    processing the media content data to generate display metrics based on the media content data, the display metrics being associated with a display screen of a remote control device that is separate from the playback unit, and
    at the remote control device,
    wirelessly receiving the display metrics communicated from the playback unit; and
    displaying the media content data on the display screen based on the display metrics,
    wherein the display metrics are generated by the playback unit in response to a user action to display data, the user action sent from the remote control device,
    wherein the remote control device is configured to transmit glyph metrics to the playback unit for use by the playback unit in calculating display metrics for use by the remote control device in displaying the data, the data describing media content playable on a media player controlled by the playback unit,
    wherein the playback unit is configured to transmit a request for the glyph metrics to the remote control device in response to the user action sent from the remote control device,
    wherein the remote control device is configured to responsively retrieve the glyph metrics from a table and transmit the retrieved glyph metrics to the mater unit,
    wherein glyph metrics comprise information about glyphs to be displayed on the remote control device indicated by the playback unit in the request, the glyphs including symbols, images and characters, and
    wherein the display metrics generated by the playback unit and provided to the portable remote control device define a manner in which the glyphs are to be displayed on the display screen including spacing to enhance readability.

5. The method of claim 4, which includes processing the media content data based on both the media content data and the glyph metrics,
    wherein the method further comprises:

rendering, by the remote control device, images used in a visual representation of the media content data to the display screen based the display metrics.

6. The method of claim 5, which includes wirelessly communicating the glyph metrics from the remote control device to the playback unit.

7. The method of claim 6, wherein the glyph metrics are associated with glyphs used in the visual representation of data on the display screen and includes glyph metrics including physical dimensions occupied by an associated glyph when displayed on the display screen, and
   wherein the display metrics define a manner in which a content item or character is displayed on the display screen, the display metrics including spacing to enhance readability of a content item of character on the display screen.

8. The method of claim 7, wherein the media content data identifies a plurality of media files and is arranged in a content hierarchy, the method including processing a title of a media file based on the glyph metrics to generate the display metrics that define a manner in which the title is displayed on the display screen.

9. The method of claim 7, which includes processing a group description of a plurality of media files in the content hierarchy based on the glyph metrics to generate the display metrics that define a manner in which the group description is displayed on the display screen.

10. The method of claim 7, which includes at the playback unit determining at least one of a spacing between adjacent glyphs, and a proposed position of each glyph on the display screen.

11. The method of claim 7, which includes at the remote control device retrieving a glyph from a corresponding font table and placing the glyph on the display screen based on the display metrics received from the playback unit.

12. The method of claim 7, which includes updating only that portion of the display screen identified by the display metrics using glyphs identified by the display data processor.

13. The method of claim 7, which includes horizontally scrolling media content data on the display screen under control of the playback unit.

14. A system to display media content data to a user for playback on a playback device, the system including:
   a playback unit including:
     means to communicate with a media storage device thereby to receive the media content data;
     means to process the media content data and generate display metrics based on the media content data; and
     a bi-directional remote control communication means, and
   a separate remote control device to select the digital media for playback on the playback device, the remote control device including:
   a complemental remote control communication means for bi-directional communication with the remote control communication interface of the playback unit;
   display means; and
   display rendering means to display the media content data on the display means based on the display metrics,
   wherein the display metrics are generated by the playback unit in response to a user action for displaying data, the user action sent from the separate remote control device, and
   wherein the remote control device is configured to transmit glyph metrics to the playback unit for use by the playback unit in calculating the display metrics for use by the remote control device in displaying the data, the data describing media content playable on a media player controlled by the playback unit,
   wherein the playback unit is configured to transmit a request for the glyph metrics to the remote control device in response to a user action sent from the remote control device and the remote control device is configured to responsively retrieve the glyph metrics from a table and transmit the retrieved glyph metrics to the mater unit,
   wherein glyph metrics comprise information about glyphs to be displayed on the remote control device indicated by the playback unit in the request, the glyphs including symbols, images and characters, and
   wherein the display metrics generated by the playback unit and provided to the portable remote control device define a manner in which the glyphs are to be displayed on the display screen including spacing to enhance readability.

15. A machine readable medium that stores instructions for execution by one or more processors to perform operations comprising:
   communicating with a media storage device thereby to receive media content data;
   communicating the media content data to a separate remote control device including a display screen for selecting digital media for playback on a playback device, the digital media being identified by the media content data;
   processing the media content data and generate display metrics based on the media content data; and
   communicating the display metrics to the remote control device for display on the display screen,
   wherein the display metrics are generated by the playback unit in response to a user action for displaying data, the user action sent from the separate remote control device, and
   wherein the remote control device is configured to transmit glyph metrics to the playback unit for use by the playback unit in calculating display metrics for use by the remote control device in displaying the data, the data describing media content playable on a media player controlled by the playback unit,
   wherein the playback unit is configured to transmit a request for the glyph metrics to the remote control device in response to a user action sent from the remote control device and the remote control device is configured to responsively retrieve the glyph metrics from a table and transmit the retrieved glyph metrics to the mater unit,
   wherein glyph metrics comprise information about glyphs to be displayed on the remote control device indicated by the playback unit in the request, the glyphs including symbols, images and characters, and
   wherein the display metrics generated by the playback unit and provided to the portable remote control device define a manner in which the glyphs are to be displayed on the display screen including spacing to enhance readability.

* * * * *

UNITED STATES PATENT AND TRADEMARK OFFICE
CERTIFICATE OF CORRECTION

PATENT NO. : 7,535,465 B2 Page 1 of 1
APPLICATION NO. : 10/654122
DATED : May 19, 2009
INVENTOR(S) : Morse et al.

It is certified that error appears in the above-identified patent and that said Letters Patent is hereby corrected as shown below:

On the Title Page Item (56) on Page 2, line 21, delete "non" and insert -- Non --, therefor.

On Sheet 14 of 15, in Fig. 16 (Reference Numeral – 304), line 2, delete "GLYPTHS" and insert -- GLYPHS --, therefor.

In column 13, line 61, in Claim 1, delete "mater" and insert -- master --, therefor.

In column 14, line 13, in Claim 2, delete "the" and insert -- on the --, therefor.

In column 14, line 54, in Claim 4, delete "mater" and insert -- master --, therefor.

In column 15, line 3, in Claim 5, delete "the" and insert -- on the --, therefor.

In column 16, line 13, in Claim 14, delete "mater" and insert -- master --, therefor.

In column 16, line 23, in Claim 15, delete "machine readable" and insert -- machine-readable --, therefor.

In column 16, line 52, in Claim 15, delete "mater" and insert -- master --, therefor.

Signed and Sealed this

Twenty-first Day of July, 2009

JOHN DOLL
*Acting Director of the United States Patent and Trademark Office*